UNITED STATES PATENT OFFICE.

ARNALDO CAROSELLI, OF FLORSHEIM-ON-THE-MAIN, GERMANY, ASSIGNOR TO THE FIRM OF CHEMISCHE FABRIK FLÖRSHEIM, DR. H. NOERDLINGER, OF FLÖRSHEIM-ON-THE-MAIN, GERMANY.

PROCESS OF MANUFACTURING CAOUTCHOUC-LIKE PRODUCTS.

1,086,139.  Specification of Letters Patent.  Patented Feb. 3, 1914.

No Drawing.  Application filed August 2, 1911. Serial No. 641,942.

*To all whom it may concern:*

Be it known that I, ARNALDO CAROSELLI, doctor of philosophy, subject of the German Emperor, and residing at Flörsheim-on-the-Main, Germany, have invented a certain new and useful Improved Process of Manufacturing Caoutchouc-like Products, of which the following is a specification.

The subject-matter of my invention is a process of manufacturing caoutchouc-like products which consists in treating mixtures of oxidized oils and phenols in the presence of a condensation agent with formaldehyde or a substance which produces formaldehyde.

The new condensation products made from oxidized oils differ in their gum-like character from the well-known rosin-like condensation products obtained with formaldehyde from phenols.

How my process may be carried into practice will now be explained with reference to some examples:—

4 kilos. naphthol are dissolved in 50 kilos. oxidized castor-oil, whereupon a mixture of 20 kilos. 30% formaldehyde and 2½ kilos. hydrochloric acid is added to this solution. When heated to 90° to 100° C. an exceedingly elastic solid body is formed.

Instead of or in addition to the phenols other substances which give reactions with aldehydes, such as vegetable and animal albumins or bodies containing albumin, *e. g.* casein, milk, blood and the like, may be added to the reaction mixture. In this case I proceed, for example, as follows: I). 100 parts of castor-oil, treated for 12 hours at about 150° to 200° C., are mixed, at a gentle heat, with 4 parts cresol, 15 parts 30% formaldehyde, 5 parts concentrated hydrochloric acid and 30 parts casein, and heated slowly to about 95° C. At this temperature a tough, elastic body is formed which is washed with water and dried.

Instead of castor-oil oxidized linseed-oil can be taken which is then treated further with the same quantities of formaldehyde, hydrochloric acid and casein.

Instead of formaldehyde other aldehydes and substances such as carbo-hydrates, starch-flour, sucrose, glucose, levulose and others can be employed. The reaction takes place somewhat slower, it is true, but likewise yields very elastic products. Substances which readily decompose liberating formaldehyde can be used as equivalents of formaldehyde. The process is then, for example, as follows:—

Example I: 100 parts oxidized castor-oil, 4 parts carbolic acid, 40 parts wheat-starch, 50 parts sulfuric acid of sp. gr. 1.31 are intimately mixed together and heated, with agitation, on the water-bath until an elastic mass is produced. The product thus obtained is liberated from excess sulfuric acid by kneading with water.

Example II: 100 parts oxidized castor-oil, 4 parts carbolic acid, 20 parts sucrose, 20 parts sulfuric acid of sp. gr. 1.185 are treated in the same manner as stated in Example I.

As the products obtained according to the present invention are to be used, among other purposes, in the manufacture of linoleum, artificial leather, packing and insulating materials, in order at once to produce such products the reaction mass may have added to it indifferent substances and loading materials which do not themselves need to enter into reaction with the reaction substances, as *e. g.* powdered cork, powdered wood, cellulose, clay, earthy pigments, kieselguhr and other loading materials of any desired kind according in each instance to the special properties which the finished products are to acquire.

I claim:—

1. The hereindescribed process of manufacturing caoutchouc-like products, which consists in treating a mixture of an oxidized oil and a phenol in the presence of a condensation agent with an aldehyde.

2. The hereindescribed process of manufacturing caoutchouc-like products, which consists in treating a mixture of an oxidized oil and a phenol in the presence of a condensation agent with formaldehyde.

3. The hereindescribed process of manufacturing caoutchouc-like products, which consists in treating a mixture of oxidized oils, phenols and albumins in the presence of a condensation agent with an aldehyde.

4. The hereindescribed process of manufacturing caoutchouc-like products, which consists in treating a mixture of oxidized oils, phenols and loading materials in the presence of a condensation agent with an aldehyde.

5. The hereindescribed process of manufacturing caoutchouc-like products, which consists in heating a mixture of an oxidized oil and a phenol in the presence of a condensation agent with an aldehyde at a gentle heat, and in then washing and drying the product thus obtained.

In testimony whereof, I affix my signature in the presence of two witnesses.

ARNALDO CAROSELLI.

Witnesses:
    JEAN GRUND,
    CARL GRUND.